Patented May 8, 1928.

1,668,941

UNITED STATES PATENT OFFICE.

LOUIS BURGESS, OF BAYONNE, NEW JERSEY, ASSIGNOR TO STANDARD OIL DEVELOPMENT COMPANY, A CORPORATION OF DELAWARE.

TREATING EMULSIONS.

No Drawing.   Application filed March 20, 1923.   Serial No. 626,378.

This invention relates to the art of treating emulsions of hydrocarbon oils and water, and will be fully understood from the following description.

It has been heretofore proposed to treat, for the purpose of breaking, the emulsions commonly occurring in refinery practice, by means of sodium salts of sulphonic acid. This procedure necessitates a particular preparation of the agent and in practice offers inconveniences. I have now discovered that the sulphonic acids, as derived from sludge of hydrocarbon oils which have been refined with fuming or concentrated sulphuric acid, accomplish an improved result in the breaking of emulsions.

Sludges separated from hydrocarbon oils, particularly lubricating oils, after treating with fuming sulphuric acid or the anhydride $SO_3$, ordinarily quite largely consist of hydrocarbon-sulphonic acids. Sludges also derived by treating such oils with concentrated sulphuric acid, not fuming, also may contain substantial percentages of hydrocarbon-sulphonic acids. The petroleum-sulphonic acids referred to however, wherever found, may be identified by their characteristics. They are soluble in water but easily salted out by electrolytes, especially for instance sodium chloride or hydrochloric acid. They are not easily hydrolized and are stable in boiling solution; but by heating with mineral acids at temperatures as high as 180° C. under pressure in an autoclave they can be broken down with formation of sulphuric acid and neutral hydrocarbons. They form salts with bases, the salts of the alkalis being very soluble in water, while the calcium and aluminum salts are apparently insoluble in water.

In proceeding in accordance with this invention the sludge separated from a treated oil, such as a lubricating oil, where fuming or concentrated sulphuric acid has been used, preferably the sludge from fuming acid treating, is purified to obtain the sulphonic acids, for example by washing with hydrochloric acid diluted for instance to about 10%, the washing being repeated until the material is substantially free from sulphuric acid. The hydrochloric acid may be finally removed by pressing or evaporation. If desired, instead of washing directly with the diluted acid the sludge can be dissolved in water and then be precipitated out by hydrochloric acid, these steps being repeated until the material is substantially free from sulphuric acid. To the emulsion to be treated there is then added sulphonic acid purified as described in the foregoing, using a proportion of about one-fourth to five percent or more by volume. The precise character of the oil emulsion will determine the best proportion to be used, more refractory emulsions requiring of course more of the acid. The mixture is now preferably heated, in an acid resistance receptacle, the temperature being raised to 100-212° F. The heating is not absolutely necessary, but for average concentrations of the sulphonic acid will accelerate the separation. In case heating is not desired the percentage of sulphonic acid should be considerably increased to obtain results within practicable time limits. As a specific example, a separator slop emulsion is treated with 2% of sulphonic acid, introduced for instance in the form of a 20% aqueous solution, and the mixture is heated up to about 170° F. On standing the mass separates into two layers, the upper of which is oil and the lower water and dirt.

It will be understood, of course, that field emulsions may be treated in accordance with this process as well as refinery emulsions.

In the appended claims I have used the term "strong sulfuric acid" as generic to all concentrations of sulfuric acid, including fuming acid, which will produce mineral oil sulfonic acids suitable for the purpose herein defined.

What I claim is:

1. The improvement in the art of treating emulsions of hydrocarbon oils and water, which comprises adding thereto one-fourth to five percent of sulphonic acid obtained from sludge of lubricating oil refined with strong sulphuric acid, then heating the mixture to about 170° F.

2. The improvement in the art of treating emulsions of hydrocarbon oils and water, which comprises adding thereto sulphonic acid obtained from sludge of hydrocarbon oil refined with strong sulphuric acid, in the proportion of one-fourth to five percent and heating the mixture.

3. The improvement in the art of treating emulsions of hydrocarbon oils and water, which comprises adding thereto a sulphonic acid obtained from sludge of hydrocarbon oil refined with strong sulphuric acid, in the proportion of one-fourth to five percent.

4. The improvement in the art of treating emulsions of hydrocarbon oils and water, which comprises adding thereto a sulphonic acid obtained from sludge of hydrocarbons refined with strong sulphuric acid.

5. The improvement in the art of treating emulsions hydrocarbon oils, which comprises subjecting the emulsified oil to the action of a water soluble sulphonic acid derived from the refining of hydrocarbons with strong sulfuric acid.

6. Method according to claim 5, in which the water soluble sludge sulfonic acid is derived from the treatment of hydrocarbon oil with fuming sulfuric acid.

7. Method according to claim 5, in which the mixture of the oil to be treated and the sulfonic acid is heated to a temperature of at least 100° F.

LOUIS BURGESS.